Feb. 16, 1971 H. KUNIG ET AL 3,563,072
CONTROL SYSTEM FOR THE AUTOMATIC CONTROL OF FLUCTUATIONS AND
STABILIZATION OF STRIP THICKNESS IN CONTROL ROUTES
Filed June 18, 1968 2 Sheets-Sheet 1

INVENTOR.
Helmut Kunig
Karl-Heinz Piehl
Walter Clementsen
By Beaman & Beaman
attys United States Patent Office 3,563,072
Patented Feb. 16, 1971

3,563,072
CONTROL SYSTEM FOR THE AUTOMATIC CONTROL OF FLUCTUATIONS AND STABILIZATION OF STRIP THICKNESS IN CONTROL ROUTES
Helmut Kunig, Reinbek, Karl-Heinz Piehl, Geesthacht, and Walter Clementsen, Hamburg, Germany, assignors to Hanseatische Motoren-Gesellschaft m.b.H., Hamburg, Germany
Filed June 18, 1968, Ser. No. 737,901
Int. Cl. B21b 37/02
U.S. Cl. 72—16                    6 Claims

ABSTRACT OF THE DISCLOSURE

The invention relates to a control system for the automatic control of fluctuations and the stabilization of strip thickness, which system comprises a plate and pins axially displaceable in the plate with said fluctuations, the amount of this displacement serving as a reference quantity for the deviation from nominal thickness. The axial position of each pin after displacement is scanned photoelectrically. The produced electrical signals are converted to mechanical movements for readjusting the strip thickness to its nominal value. This system allows sensing the strip thickness with only small roll pressure and simple transformation of the weak force available from the sensing operation into the strong forces required for mechanical stabilization of strip thickness.

BACKGROUND OF INVENTION

The field of the invention relates to a control system for the automatic control of fluctuations and stabilization of strip thickness which comprises a plate and pins axially displaceably supported in the plate, the pin displacement being dependent on said fluctations and serving as a reference indicator for the deviation from nominal thickness.

The axial adjustment and displacement of the pins which are slidably supported in the plate is known to be produced, for example, by a pair of shifting jaws which are directly or indirectly connected to a feeler roll continuously sensing the thickness of a running strip. In this arrangement only comparatively weak forces are available to adjust the pins. The displacement of the pins, therefore, must be effected with the smallest possible force in order to keep the pressure on the strip to be sensed as low and constant as possible.

But as the pins have to transmit the signal represented by their displacement to a control device for eliminating the deformation, for example an infinitely variable speed transmission, the actuation of which requires considerable forces, the construction of the plate with said pins and, in particular, the mounting of the pins in the plate poses an extraordinary problem. On the one hand, the pins are to be supported for easiest possible motion and, on the other hand, the pins must be fitted in the plate so tightly that they may actuate the said control device without returning automatically to their starting position.

It may be imagined that the pins arranged concentrically on the rotating plate in a circle and in parallel with the axis of the plate may be braked tightly during the rotation of the plate so that they will be required for the actuation of the control device. Another possibility resides in braking the pins at the place where the signal obtained from sensing the strip thickness is transmitted to them, only in such a degree that they can be displaced comparatively easily. This braking might then be increased at the place where the pins actuate the control device of the infinitely variable speed transmission, to such an extent that the pins can do this without themselves being automatically displaced. The corresponding constructions, however, are rather complicated and costly, because it is necessary for them to locally apply variable braking moments.

SUMMARY OF THE INVENTION

It is the object of the invention to overcome the said known difficulties. This is achieved in that the various positions of the pin ends are scanned photoelectrically, with said pin ends passing through a light barrier consisting of a photocell and a light source. The solution proposed in accordance with the invention guarantees that the usual sleeve bearing of the pins in the plate is sufficient to allow axial adjustment and displacement by means of the shifting jaws with low input force. On the other hand, the invention allows actuation of the control device for the infinitely variable speed transmission without undesired displacement of the pins.

In a preferred embodiment of the invention electric pulses supplied by the light barrier via an amplifier are transformed into mechanical energy whereby an infinitely variable speed transmission is adjusted and the light barrier is shifted into its center position with respect to the ends of the pins for feedback purpose.

In another embodiment the electric pulses supplied by the light barrier via an amplifier operate an electric motor actuating the speed transmission.

Preferably, the electric pulses supplied by the light barrier via an amplifier and a moving coil governor, or a solenoid valve, control the hydraulic pressure generated by a motor pump, in such a manner that the piston of a hydraulic cylinder unit is displaced which is in communication with a control rod connected to the speed transmission, and at the other end thereof a yoke which carries the light barrier.

In practice, the ends of the pins are formed with a diameter greater than the actual pin diameter.

In this manner, the light beam emanating from the light source of the light barrier and directed to the photocell is controlled only by the broadened pin ends and no light is allowed to pass between the pin ends.

BRIEF DESCRIPTION OF THE DRAWING

The invention is diagrammatically shown in the drawing by way of two embodiments. In the drawings.

DESCRIPTION OF TWO PREFERRED EMBODIMENTS

Figure 1:
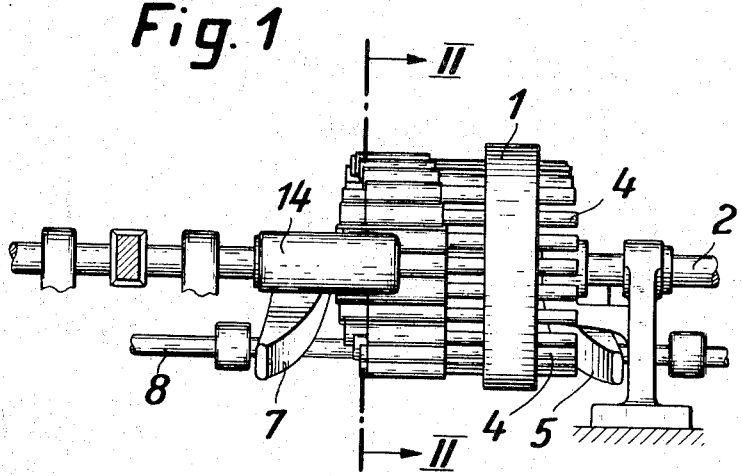
FIG. 1 shows a side elevational view of the plate with pins together with a pair of caliper jaws.

The plate 1 represented in FIG. 1 is driven by driving means (not shown) via a driving shaft 2, and is provided with pins 4 spaced equidistantly from each other in a circular arrangement. The pins are slidably supported in said plate and may be axially adjusted or displaced by shifting jaws 5 and 7. For this purpose, the pair of shifting jaws 5, 7 is fastened to a control rod 8 which is indirectly or directly connected to a conventional strip feeler roll (not shown) sensing the thickness of the strip being processed.

Figure 3:
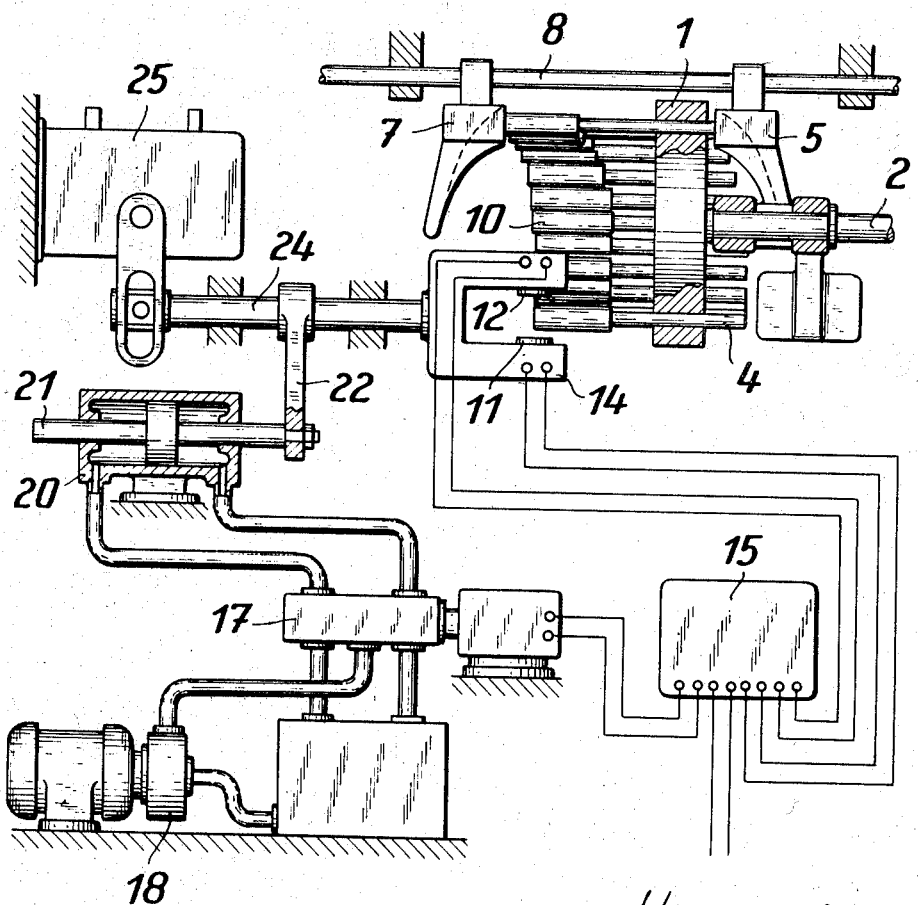
FIG. 3 shows a partly sectional side elevational view of the plate with pins and the control apparatus according to a first embodiment of the invention.
Figure 2:
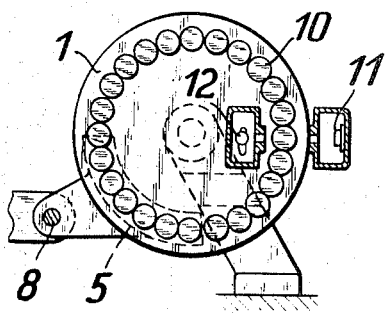
FIG. 2 shows a cross sectional view taken along line II—II of FIG 1.

As can be seen from FIGS. 2 and 3 the pins 4 are provided with enlarged diameter ends 10 which upon rotation of the plate 1 move through a light barrier or path consisting, for example, of a photocell 11 and a light source 12. The light path devices are mounted on a U-shaped yoke which, with fluctuations of the strip thickness, is axially moved in a manner described herebelow in more detail.

The pulses supplied by the light barrier which, dependent upon the axial position of the pins 4 and the pin ends 10, may form a positive or negative signal, pass over an amplifier 15 to a moving coil governor or solenoid valve 17 which controls the fluid flow from a motor driven pump 18 to one of the sides of a piston having a piston rod 21 fastened thereto and being movable to-and-fro in a hydraulic cylinder 20. A control rod 24 fastened to the piston rod 21 by means of an arm 22 carries at its one end the yoke 14 holding the light barrier and is pivoted at its other end to an adjustable lever of an infinitely variable speed transmission 25 which regulates the rolls or other device that determines the strip thickness.

The method of operation of the apparatus shown in FIGS. 1-3 is as follows:

In case of fluctuations of the strip thickness, i.e. in case of inadmissible tolerances with respect to the nominal strip thickness the control rod 8 of the pair of shifting jaws 5, 7 is axially adjusted by means of the feeler roll (not shown) sensing the strip, for instance, a fiber web, so that depending on wherether the strip thickness decreases or increases, either the shifting jaw 5 or the shifting jaw 7 will come to lie close against the corresponding ends of the pins 4, initiating the axial displacement thereof. In the embodiment shown in the drawing, the shifting jaw 5 is about to displace the pins 4 with their pin ends 10 to the left a certain distance.

As the plate 1 with the pins 4 rotates, the pin ends 10 displaced in this manner pass through the light barrier consisting of the photocell 11 and the light source 12. As the light barrier and the pair of shifting jaws effecting the adjustment of the pins are arranged at the pin circle in a phase shifting, for example in opposition, pulses will be emitted by the light barrier after a predetermined time lag which may be positive or negative dependent upon the displacement of the pin ends from their center position.

These pulses are supplied to the amplifier 15 which actuates the moving coil governor or a solenoid valve 17 connected to the hydraulic pump 18 in such a manner that the piston rod 21 is displaced thereby taking along with it the control rod 24. By this, both the infinitely variable speed transmission 25 which determines the deformation of the strip, for example a fiber web is adjusted and the yoke 14 carrying the light barrier is moved until the light barrier again reaches its center position with respect to the respective one of the pin ends 10. Then the control action is finished.

Figure 4:
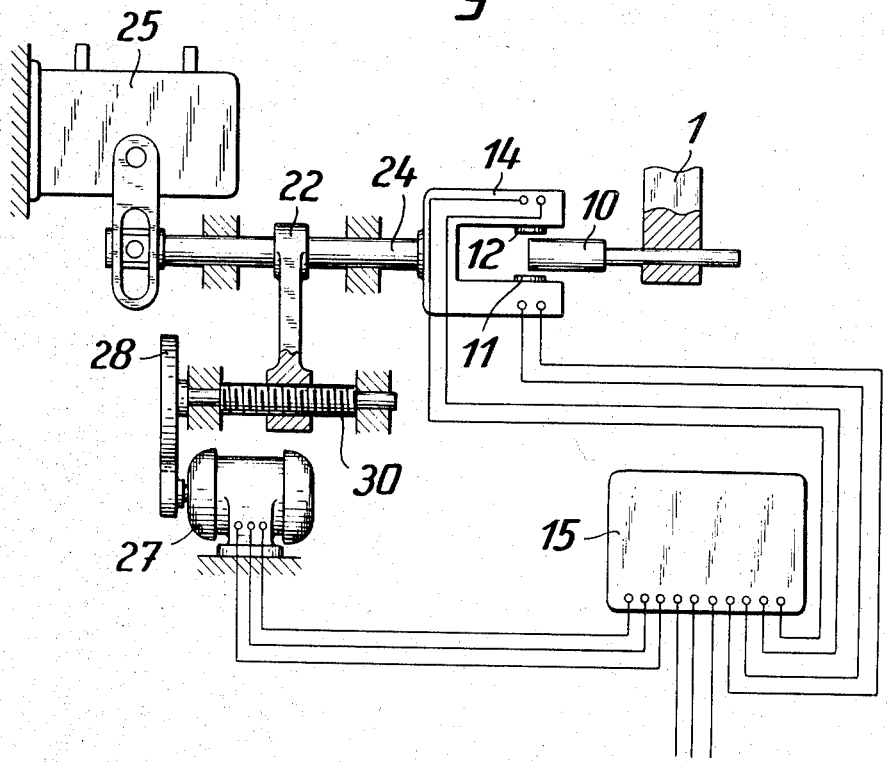
FIG. 4 shows a partly sectional side elevational view of a second embodiment of the invention.

FIG. 4 shows another embodiment of the invention. Without provision of a hydraulic system, an electric motor 27 is actuated by the pulses coming from the light barrier 11, 12 and amplified by the amplifier 15. The motor may be driven either clockwise or counterclockwise dependent upon whether the pulses are negative or positive, and drives an adjusting spindle 30, for instance via a belt drive 28, which spindle again actuates the control rod 24 in the manner as described above, via the arm 22.

What we claim is:

1. An apparatus for automatically regulating a dimension of a moving strip of material wherein the dimension is regulated by adjustable sizing apparatus and dimension feeler means sense the resultant strip material dimension comprising, in combination, mechanical strip dimension indicating storage means including a rotating member, a plurality of elements movably mounted on said rotating member to selected positions, element locating means connected to the strip dimension feeler means moving and locating said elements on said rotating member under the control of the dimension feeler means, element position sensing means sensing the position of said elements on said rotating member, servo means connected to said element position sensing means connected to and regulating the adjustable strip sizing apparatus, and feedback means disposed between said servo means and said element position sensing means positioning said element position sensing means in accordance with adjustments made to the sizing apparatus.

2. An apparatus for automatically regulating a dimension of a moving strip of material as in claim 1 wherein said rotating member comprises a plate having an axis of rotation and said elements comprise axially movable pins mounted on said plate concentrically related to said plate axis of rotation.

3. An apparatus for automatically regulating a dimension of a moving strip of material as in claim 2 wherein said pins include enlarged opaque ends and said element position sensing means includes a light path sensing the position of said pin ends and a photocell disposed within said light path.

4. An apparatus for automatically regulating a dimension of a moving strip of material as in claim 1 wherein said element position sensing means includes a photocell and light source defining a light path, said elements passing through said light path whereby the position of said elements with respect to said rotating member is sensed.

5. An apparatus for automatically regulating a dimension of a moving strip of material as in claim 1 wherein said servo system comprises a hydraulic motor having a piston connected to the sizing apparatus and said feedback means, a control valve regulating said motor and piston position, and control means connecting said valve to said element position sensing means.

6. An apparatus for automatically regulating a dimension of a moving strip of material as in claim 1 wherein said servo system comprises an electric motor drivingly connected to a threaded shaft connected to the sizing apparatus and said feedback means, and control means connecting said electric motor to said element position sensing means.

References Cited

UNITED STATES PATENTS

| 2,275,509 | 3/1942 | Dahlstrom | 72—9 |
| 3,022,688 | 2/1962 | Sims | 72—21X |
| 3,096,671 | 7/1963 | Vossberg | 72—11X |

MILTON S. MEHR, Primary Examiner

U.S. Cl. X.R.

91—363; 33—147